United States Patent
Park et al.

(10) Patent No.: US 9,674,114 B2
(45) Date of Patent: Jun. 6, 2017

(54) MODULAR DECOUPLED CROSSBAR FOR ON-CHIP ROUTER

(75) Inventors: Dongkook Park, Santa Clara, CA (US); Aniruddha Vaidya, Sunnyvale, CA (US); Akhilesh Kumar, Saratoga, CA (US); Mani Azimi, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 13/994,801

(22) PCT Filed: Feb. 9, 2012

(86) PCT No.: PCT/US2012/024551
§ 371 (c)(1),
(2), (4) Date: Sep. 4, 2014

(87) PCT Pub. No.: WO2013/119241
PCT Pub. Date: Aug. 15, 2013

(65) Prior Publication Data
US 2014/0376557 A1    Dec. 25, 2014

(51) Int. Cl.
*H04L 12/28*    (2006.01)
*H04W 4/00*    (2009.01)
(Continued)

(52) U.S. Cl.
CPC ...... *H04L 49/101* (2013.01); *G06F 15/17381* (2013.01); *G06F 15/7825* (2013.01);
(Continued)

(58) Field of Classification Search
CPC ..... H04L 49/101; H04L 49/109; H04L 49/15; G06F 15/7825; G06F 15/17381; Y02B 60/1225; Y02B 60/1207
See application file for complete search history.

(56) References Cited

U.S. PATENT DOCUMENTS

| 6,060,903 A | 5/2000 | Rangasayee et al. |
| 2003/0040898 A1 | 2/2003 | McWilliams et al. |

(Continued)

FOREIGN PATENT DOCUMENTS

WO    2013/119241 A1    8/2013

OTHER PUBLICATIONS

International Preliminary Report on Patentability and Written Opinion received for PCT Patent Application No. PCT/US2012/024551, mailed on Aug. 21, 2014, 5 pages.
(Continued)

*Primary Examiner* — Kiet Tang
(74) *Attorney, Agent, or Firm* — Law Office of R. Alan Burnett, PS

(57) ABSTRACT

Layout-aware modular decoupled crossbar and router for on-chip interconnects and associated micro-architectures and methods of operation. A crossbar and router architecture called MoDe-X (Modular Decoupled Crossbar) is disclosed that supports 5-port routing for use in 2D mesh interconnects and is implemented through use of decoupled row and column sub-crossbar modules in combination with feeder wiring and control logic that enables routing between ports on the row and column sub-crossbar modules. The corresponding MoDe-X router supports 5-port routing between various router input and output port combinations while reducing both router area and power consumption when compared with a conventional 5×5 crossbar design and implementation. The MoDe-X micro-architecture can be configured to support both single and dual local port injection configurations.

18 Claims, 11 Drawing Sheets

(51) Int. Cl.
    *H04L 12/56*         (2006.01)
    *H04L 12/933*       (2013.01)
    *G06F 15/173*       (2006.01)
    *G06F 15/78*         (2006.01)

(52) U.S. Cl.
    CPC ............ H04L 49/109 (2013.01); H04L 49/15 (2013.01); *Y02B 60/1207* (2013.01); *Y02B 60/1225* (2013.01)

(56) References Cited

U.S. PATENT DOCUMENTS

| | | | | |
|---|---|---|---|---|
| 2004/0085967 | A1* | 5/2004 | Boduch | H04L 12/5693 370/395.42 |
| 2004/0109412 | A1* | 6/2004 | Hansson | H04L 47/10 370/229 |
| 2005/0152352 | A1* | 7/2005 | Jun | H04L 12/5693 370/388 |
| 2006/0047849 | A1 | 3/2006 | Mukherjee | |
| 2010/0111088 | A1* | 5/2010 | Olofsson | G06F 15/17381 370/392 |

OTHER PUBLICATIONS

International Search Report and Written Opinion received for PCT Application No. PCT/US2012/024551, mailed on Oct. 25, 2012, 8 pages.

* cited by examiner

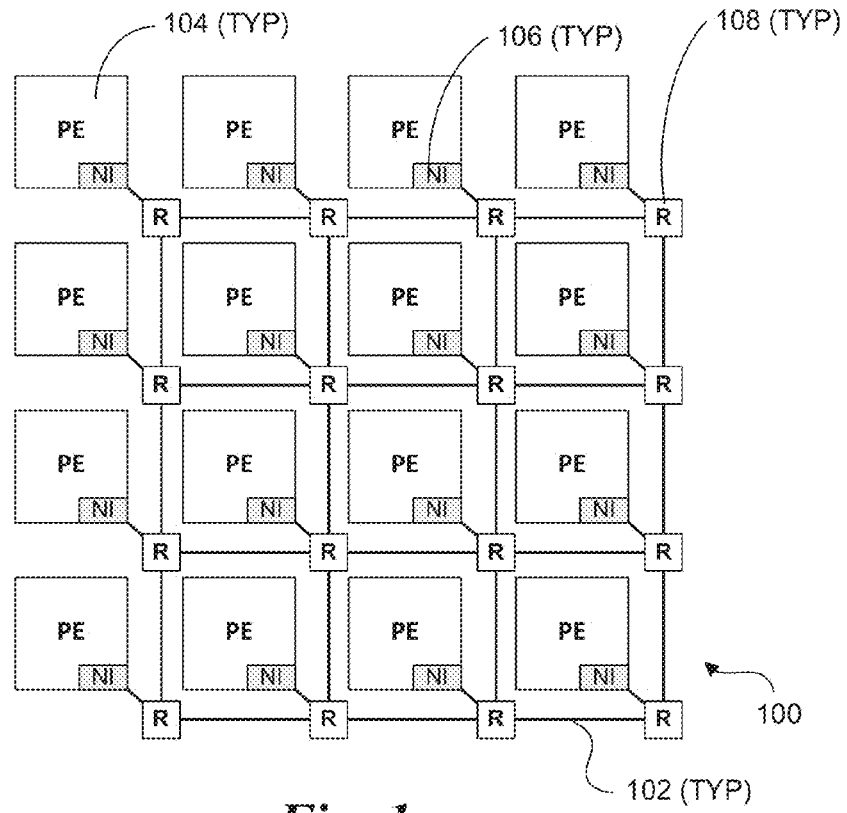
Fig. 1
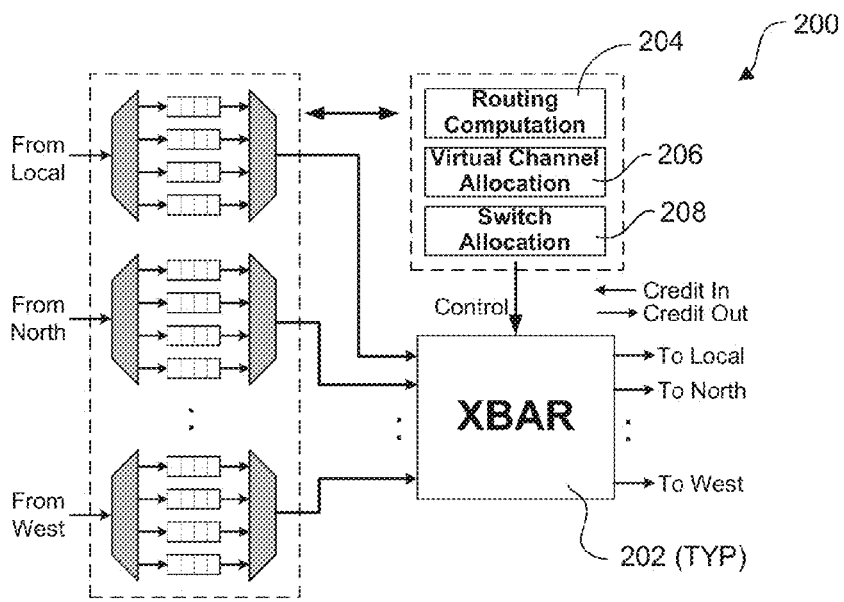
Fig. 2 *(Prior Art)*

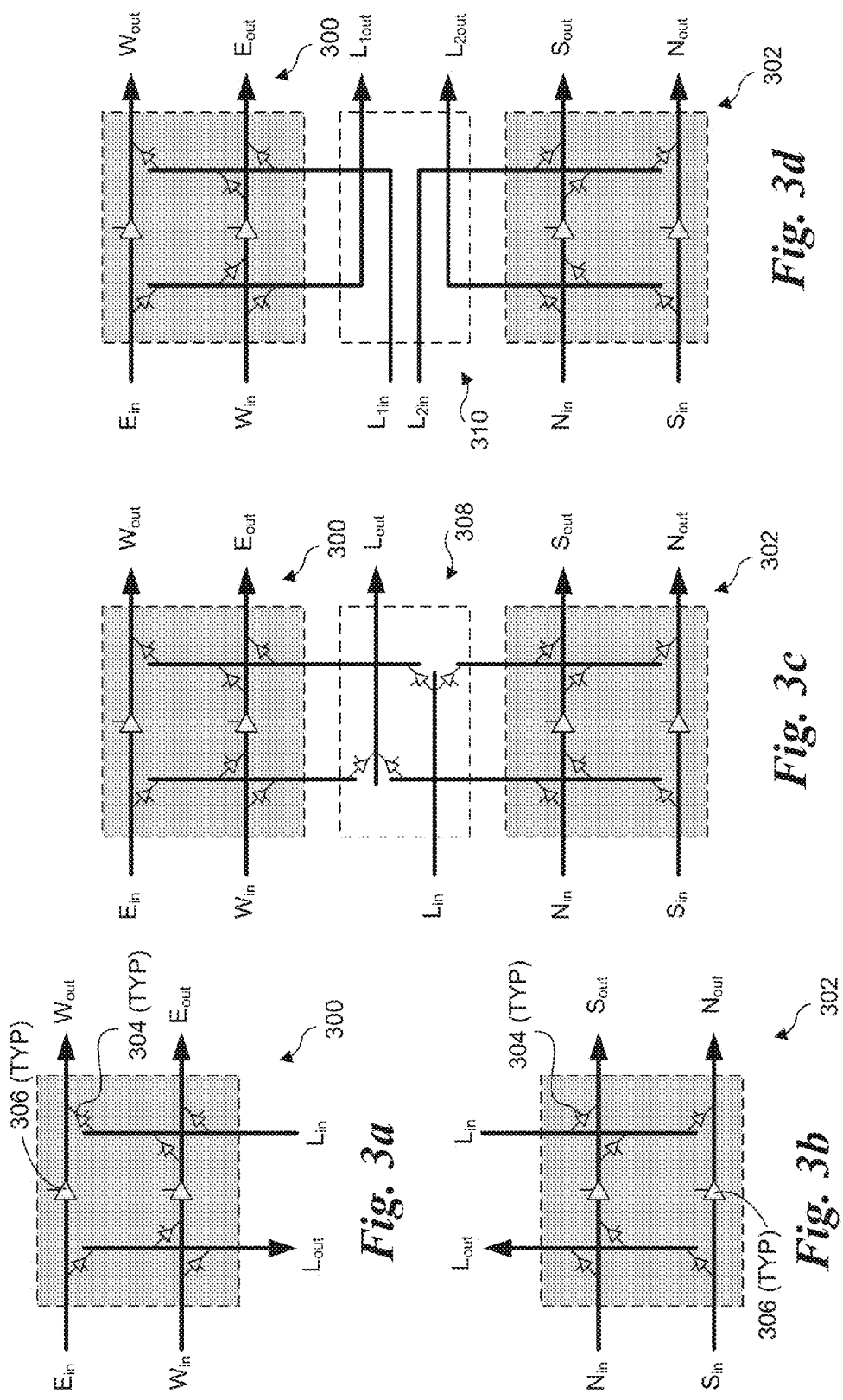

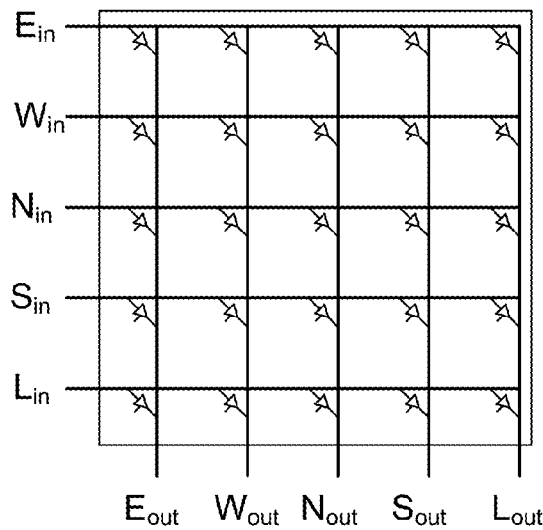
Fig. 5a *(prior art)*
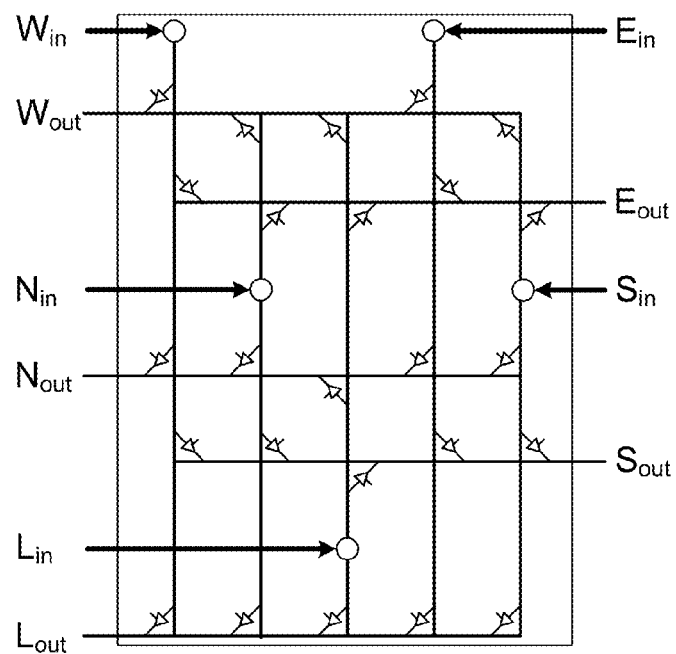
Fig. 5b

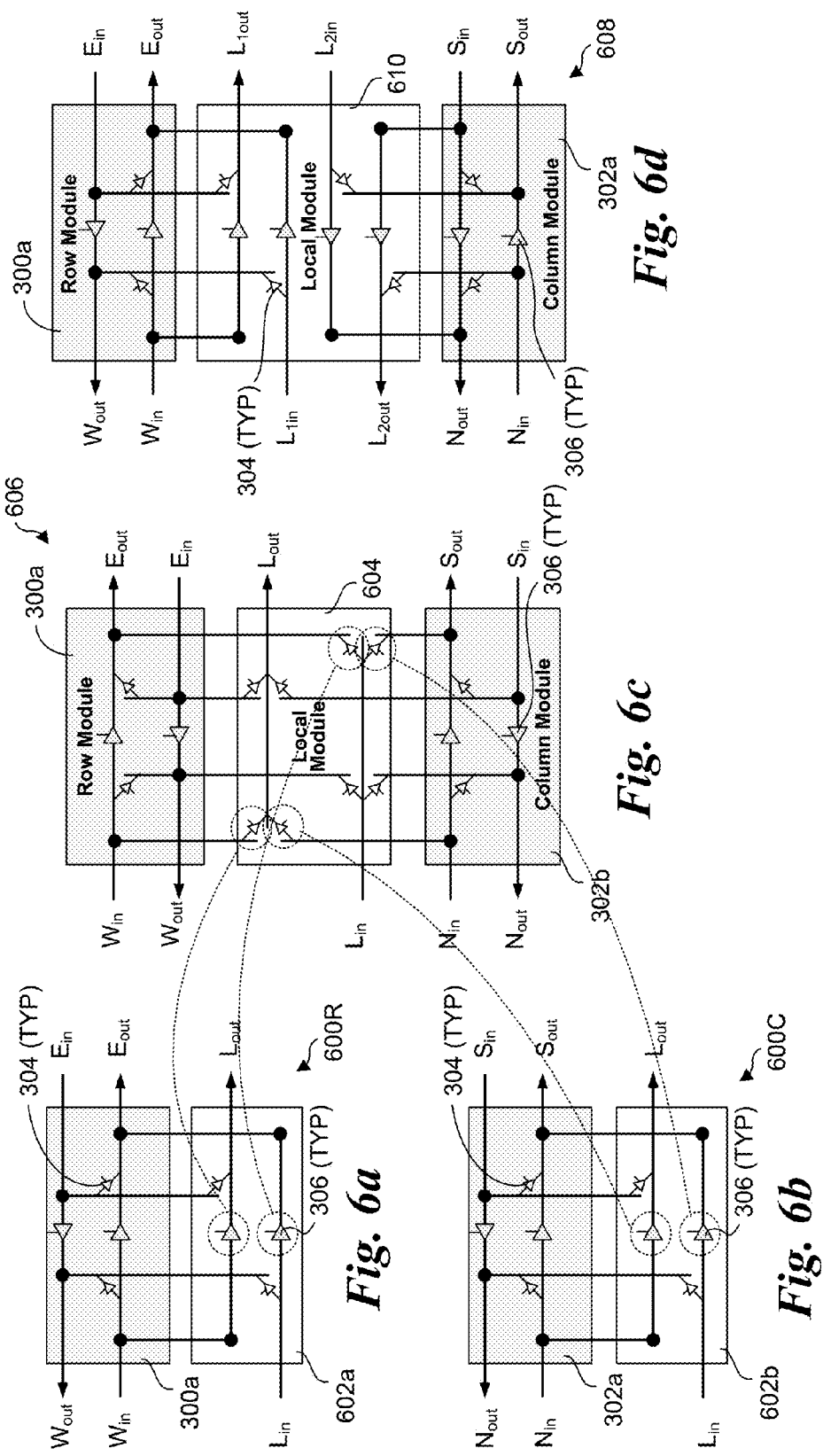

MODULAR DECOUPLED CROSSBAR FOR ON-CHIP ROUTER

FIELD OF THE INVENTION

The field of invention relates generally to computer systems and, more specifically but not exclusively relates to architectures and methods of operation for on-chip routers.

BACKGROUND INFORMATION

Recent advancements in processor architectures have resulted in an ever more prevalent use of multi-core processors in the mainstream of computing across a wide range of market segments. The debut of Intel® Corporation's Xeon 8-core "Nehalem EX" processor and the AMD's Opteron 6-core "Istanbul" processor in 2009 was followed by Intel's 10-core "Westmere-EX" and AMD's 12-core "Magny-Cours" processors. Intel's recent Single Chip Cloud computing (SCC) platform integrates 48 Intel Architecture cores on a single chip. Several non-x86 multi-core processors have also been showcased, including STI's 8-core Cell processor, Sun's 8-core Niagara, Victoria Falls (16-core), Tilera (36, 64, and 100 core versions), and Intel's TeraFLOPS Processor prototype. This overall trend toward a higher core count is expected to continue and create mainstream terascale processors with 50 to 100+ cores in the next 3-5 years.

A scalable on-chip interconnection network fabric is a key ingredient in the architecture of terascale processors. For a commercial design the interconnect architecture should offer the flexibility to scale-up or reduce the number of processor cores, be amenable to high-volume manufacturing and provide reliability. Additionally, the interconnect needs to address a principle problem of providing high performance while optimizing power consumption.

As illustrated in FIG. 1, one popular topology employs a plurality of processing elements (PE) or "tiles" configured in a two-dimensional (2D) array and interconnected via a 2D mesh interconnect 100 comprising multiple interconnect links 102. Each PE node 104 includes a network interface 106 that is connected to the interconnect mesh at a respective router 108, which may be configured as 5-port crossbar, 4-port crossbar, or 3-port crossbar depending on its location, as illustrated. The crossbar is one of the two major architectural contributors of the router power (the other significant contributor being the packet buffers). For example, crossbar power consumption is 15% of the total router power in Intel's TeraFLOPS processor. In the MIT RAW processor, the crossbar consumes 30% of the power, while in the TRIPS processor data network it consumes 33% of network power. Crossbars also collectively occupy significant layout area. Thus it would be advantageous to reduce power and/or the area occupied by the crossbars.

Earlier work on crossbar power and area reduction has used two basic approaches: decomposition and segmentation. Under the decomposition approach, a functionally larger crossbar is made of smaller sub-crossbars, resulting in a smaller area and power but restricting connectivity between some input-output pairs and/or concurrency among multiple input-output pairs. The connectivity restriction, if any, may in turn restrict the routing algorithms available for the topology. Also, the concurrency restriction may impact overall latency and throughput. The segmentation approach is focused on power reduction by energizing only the necessary wire-segment of the crossbar for establishing input-output connectivity through the use of tri-state buffers. However, the segmentation itself does not provide any area reduction. Moreover, such designs typically isolate and focus only on crossbar ignoring its inter-connectivity with other logic within the router, placement of ports, flit-buffers and drivers and inter router connectivity, all of which present real constraints. This often leads to the unrealistic optimization assuming crossbar layout from a logical view without considering physical design constraints.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 is a schematic block diagram of an exemplary 2D mesh interconnect and router configuration;

FIG. 2 is a schematic block diagram illustrating the configuration of a conventional 5×5 crossbar and associated 5-port router;

FIGS. 3a and 3b are logical representations corresponding to respective row and column 3×3 sub-crossbar designs, according to one embodiment;

FIG. 3c is a logical representation of one embodiment of a MoDe-X-Single crossbar design;

FIG. 3d is a logical representation of one embodiment of a MoDe-X-Dual crossbar design;

FIG. 5a illustrates a logical representation of a generic 5×5 crossbar without layout considerations, while FIG. 5b depicts one example of a crossbar that provides similar 5×5 connectivity while further considering physical layout of the various input and output ports to reduce wiring and area;

FIGS. 6a and 6b respectively show layout aware row and column 3×3 sub-crossbar designs, according to one embodiment;

FIG. 6c is a layout-aware MoDe-X-Single crossbar design, according to one embodiment;

FIG. 6d is a layout-aware MoDe-X-Dual crossbar design, according to one embodiment;

DETAILED DESCRIPTION

Figures 4A, 4B, 4C:
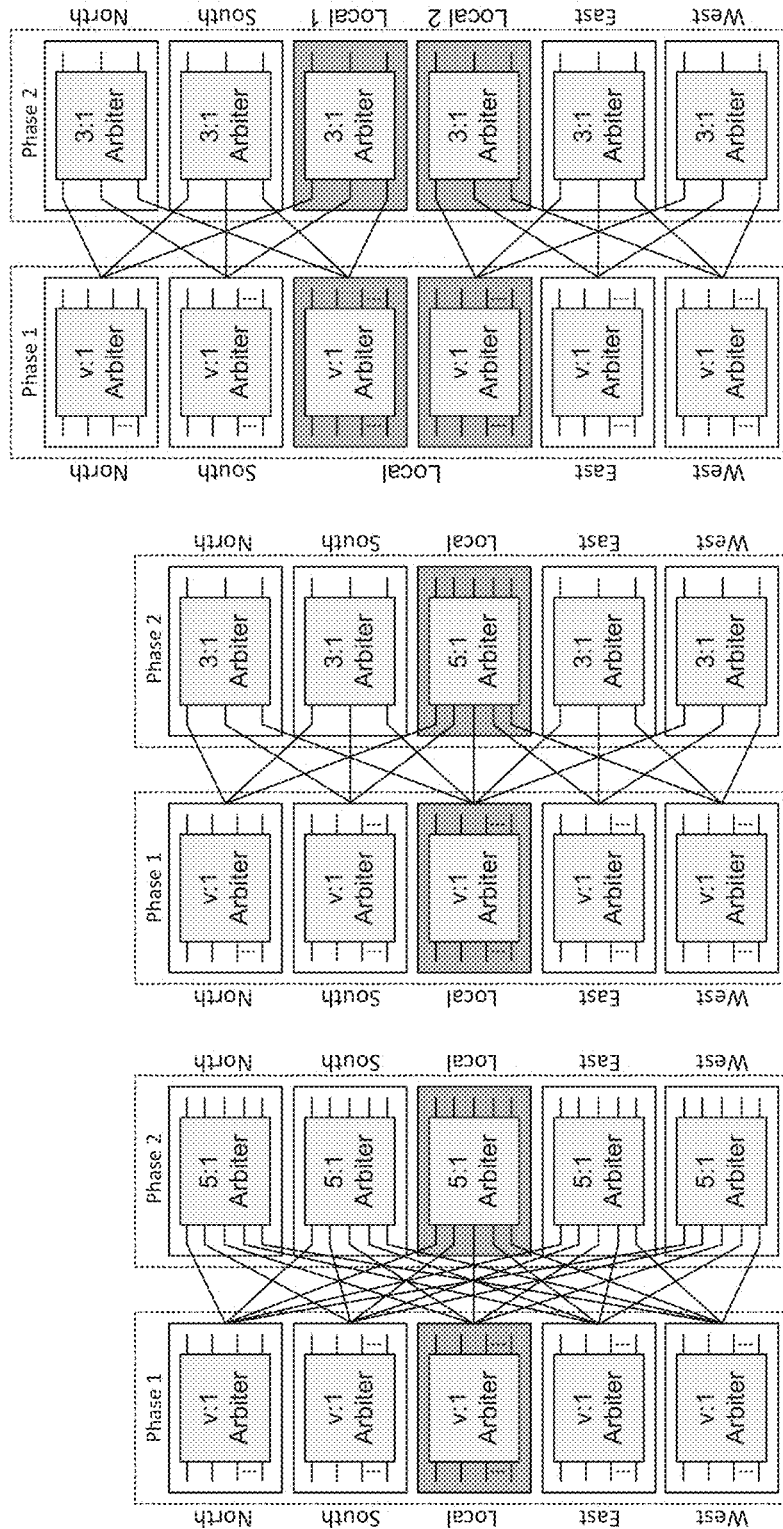
FIGS. 4a, 4b, and 4c respectively show sets of arbiters corresponding to a generic 5×5 crossbar, a MoDe-X-Single crossbar, and a MoDe-X-Dual crossbar.

Embodiments of apparatus, micro-architectures, and method of operation for a layout-aware modular decoupled crossbar for on-chip interconnects are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments described herein, a micro-architecture for a power and area efficient router for a 2D mesh interconnect is provided. The router micro-architecture employs an efficient crossbar implementation, called MoDe-X that uses a modular-decoupled crossbar that incorporates dimensional decomposition and segmentation to achieve power and area savings. However, unlike most prior work in this area that considers only logical representation of the crossbars, MoDe-X crossbars and associated routers employ physically-aware designs accounting for the actual layout of router components to reflect practical design considerations.

In order to better understand the operation and advantages of the MoDe-X crossbar and router architectures, a discussion of the conventional approach is first presented. FIG. 2 depicts details of a conventional generic input-buffered on-chip router 200 that may be implemented for 5-port routers in the 2D mesh on-die interconnect shown in FIG. 1 and discussed above. As shown in FIG. 2, router 200 comprises several functional modules and has 5 input/output ports (i.e., Local, North, East, South, and West) with each input port having a set of virtual channels and associated buffer space. The input virtual channels and buffers, as well as the crossbar 202 and interconnect links are major components of the data path of the router. The control logic includes a routing computation block 204, a virtual channel allocator 206, and switch arbitration logic 208.

When a message (e.g., comprising data encapsulated in a flow control unit or "flit") is received from either a local tile or from a neighboring router, it is first stored in an input buffer. Then, the routing computation logic 204 determines which output ports it can use. Typically, a simple deterministic X-Y routing algorithm is used. In X-Y routing, messages are forwarded to X-direction first and, if the displacement in X-direction reaches 0, then it is forwarded in the Y-direction. The X-Y routing algorithm is widely used in 2D mesh interconnects due to its simplicity and inherent deadlock freedom. However, such deterministic routing algorithms do not consider network traffic when making routing decisions and thus may be unsuitable for traffic patterns that may result in network imbalance. In such cases, a fully adaptive routing algorithm can be used instead to dynamically balance network load. However, adaptive routing algorithms are generally more complex and may require more network resources.

Once a routing decision has been made, the Virtual Channel (VC) allocation logic 206 assigns an output VC the message can use and if another message is also contending for the same output VC it performs arbitration among them and selects one winner per output VC. The Switch Arbitration (SA) logic 208 arbitrates among multiple flits from different input ports to determine which of the flits can use a given crossbar output port. Since a typical on-chip router has 5 input ports (one injection port from the local tile and four ports from each cardinal direction), a 5×5 crossbar is generally used and a maximum of five concurrent transfers can occur during each cycle. However, there are also router designs with a higher number of ports for specific purposes, and corresponding crossbars employ more complex designs to support the additional ports. The switch arbitration logic consists of several arbiters (described below in further detail) and the grant signals from the arbiter logic are fed to the crossbar control logic to appropriately turn on/off the crossbar connection points or switches (typically, tri-state buffers or pass gates are used in matrix-type crossbars). Finally, the winners from switch arbitration will go through the crossbar and then either exit to the local tile or move on to next router via inter-router interconnect links.

In general, these router modules are implemented in a pipelined manner to improve performance. To achieve optimal pipeline performance, the router's pipeline should be carefully designed considering physical layout of the design such that timing requirement of each stage is well balanced. For this, the critical path analysis should be performed at the beginning of the design phase. For example, the switch arbitration logic determines the winner for an output port and then sends the grant signal back to input port to indicate the winner. This is usually in the critical path and includes significant amount of wire delay (between switch arbitration logic near the output port and the input buffer control and VC context management logic). Depending on the physical layout of the ports, this timing can significantly vary (wire length within some input-output port pairs may be short enough to meet the tight timing requirement but others may not, which will eventually dominate the pipeline timing). Thus, it is very important to design router architectures with physical aspects in mind as opposed to only considering logical representations of the architectures.

Among various router modules, the flit-buffer and crossbar are typically two major power consumers and optimization of these modules will often directly affect overall power consumption. While buffer power can be optimized by analyzing the minimal buffer requirement or using a shared buffer architecture, the crossbar optimization is not easily viable by itself since it typically requires changes in other modules such as switch arbitration logic and routing computation logic.

Modular Decoupled Crossbar Architectures

Various deficiencies in the conventional 5-port crossbar approach are addressed by novel router architectures employing a modular decoupled crossbar design ("MoDe-X") that employs both a modular segmented design and a decoupled crossbar architecture. Due to the decoupled nature of the crossbar, its area requirement is reduced and, as a result, overall crossbar power consumption can be significantly decreased. Moreover, MoDe-X routers are designed considering the physical layout of the crossbar to minimize area and timing inconsistency between logical and physical crossbar representations.

The basic building block of the MoDe-X router is a 3×3 sub-crossbar, such as illustrated by a 3×3 Row sub-crossbar module 300 in FIG. 3a and a 3×3 Column sub-crossbar module 302 in FIG. 3b. Row sub-crossbar module 300 has two input/output port pairs ($W_{in}/W_{out}$ and $E_{in}/E_{out}$) along the same dimension and a local injection/ejection port ($L_{in}/L_{out}$). The non-injecting input ports ($W_{in}$ and $E_{in}$) have direct connection to the output ports in their opposite direction ($E_{out}$ and $W_{out}$), respectively and they are also connected to $L_{in}$ and $L_{out}$ ports via tri-state buffers 304. Each of the direct links ($E_{in} \rightarrow W_{out}/W_{in} \rightarrow E_{out}$) has a tri-state buffer 306 in the middle to ensure concurrent transfers by separating the link into two segments (e.g., to support both $L_{in} \rightarrow W_{out}$ and $E_{in} \rightarrow L_{out}$ concurrently). It is also used for power-saving purposes; if $E_{in} \rightarrow L_{out}$ is the only transfer occurring in the crossbar, for example, the left half segment of the crossbar can be totally shutdown. Column sub-crossbar module 302 shown in FIG. 3b is similarly configured to Row sub-crossbar module 300, but is used for providing a 3×3 sub-crossbar function for North and South ports rather than East and West ports.

As shown in FIG. 3c, a pair of 3×3 sub-crossbar modules (i.e., Row sub-crossbar module 300 and Column sub-crossbar module 302) are combined via a local module 308 to form a 5×5 crossbar (referred to herein as MoDe-X-Single). The $L_{in}$ and $L_{out}$ ports have connections to both sub-crossbar modules. Note that the architecture in FIG. 3c is not a full 5×5 crossbar by itself, since there is no connection between Row and Column sub-crossbar modules. At described below, the MoDe-X architecture employs additional wiring and switched connections to direct flits to an appropriate sub-crossbar that is later embedded on top of the crossbar.

The MoDe-X architecture can be extended to provide dual injection ports such that each sub-crossbar has a dedicated injection/ejection port. One embodiment of the extended design (referred herein as MoDe-X-Dual) is shown in FIG. 3d, which couples Row and Column sub-crossbar modules 300 and 302 to a local module 310. This simplifies the switch arbitration logic and reduces the size of the arbiters inside. The dual ejection configuration also supports concurrent injection/ejection to/from the on-chip network and can improve network performance.

Switch Arbitration Logic

Typical switch arbitration runs in two phases: 1) Local Arbitration (Phase 1), which selects one winner for each input port among requests from the VCs within the same input port, and 2) Global Arbitration (Phase 2), which selects one winner for each output port among requests from the winners of the Local Arbitration.

FIG. 4a shows the architecture of the switch arbitration logic for a generic 5×5 crossbar where each input port has v VCs. For Phase 1, each input port requires one (v:1) arbiter, totaling five (v:1) arbiters per router. Then for Phase 2, each output port requires one (5:1) arbiter, totaling five (5:1) arbiters per router.

Since the crossbar designs of the MoDe-X-Single and MoDe-X-Dual routers have a different number of input/output ports, the size and number of arbiters change. The arbitration logic design for one embodiment of a MoDe-X-Single router is shown in FIG. 4b, and for Phase 1 it employs the same arbiter design as a generic 5×5 crossbar. However, the Phase 2 arbitration design is different, since the crossbar is now decoupled. Therefore, each of the non-ejecting (non-local) output ports employ one (3:1) arbiter, whereas the ejecting output port still employs one (5:1) arbiter as in the generic 5×5 architecture since all input ports need to be able to eject messages through this port.

In the MoDe-X-Dual router design, however, the arbiters for injection/ejection ports also need to be decoupled to provide dual connections (logically, it is operated as a 6×6 crossbar). As shown in FIG. 4c, the arbitration logic is now totally decoupled, since each of the decoupled switch arbitration logic does not need to consider inputs from the other arbitration logic.

Overall, the complexity of the switch arbiters significantly decreases in the proposed MoDe-X-Single and MoDe-X-Dual routers, as clearly shown in FIGS. 4a-c. The details of the arbiter requirements for all three cases are summarized in Table 1 below. In addition, the reduction of the arbiter size from 5:1 to 3:1 reduces arbitration time, thus reducing the overall pipeline cycle.

|  | Generic | MD-Single Non-injection PCs → Injection PC | MD-Dual Non-Ejection PCs → Ejection PC |
| --- | --- | --- | --- |
| Phase 1 | 5 (v:1) arbiters | 5 (v:1) arbiters | 6 (v:1) arbiters |
| Phase 2 | 5 (5:1) arbiters | 4 (3:1) arbiters1 → (5:1) arbiter | 6 (3:1) arbiters |

Layout-Aware Physical Design

The designs shown in FIGS. 3a-d and 4a-c are logical representations of crossbars configured to meet certain connectivity and arbitration criteria (such as full 5×5 crossbar routing support). However, in addition to meeting such criteria, it is important to consider the layout of the physical design. For example, considering the connectivity to neighbor nodes, it would be better to locate input port buffers closer to their corresponding neighbors than having the input port buffers on one side. Similarly, the aspect ratio and orientation of flit buffer SRAMs may require that flit buffers are oriented in a particular configuration, such as in one dimension. It is also desirable to avoid excessive wiring when optimizing the layout for a power and performance focused design.

Having this in mind, even a generic 5×5 crossbar needs to be designed differently considering layout requirements. For example, FIG. 5a illustrates a logical representation of a 5×5 crossbar without layout considerations, while FIG. 5b depicts one example of a crossbar that provides similar 5×5 connectivity while further considering physical layout of the various input and output ports to reduce wiring and area.

As with the generic 5×5 crossbar layout shown in FIG. 5a, the logical representations of the MoDe-X router layouts shown in FIGS. 3a-d depict the input ports on the same side. Accordingly, it is advantageous to reconfigure these layouts in view of physical layout considerations. Embodiments corresponding to an exemplary set of crossbar configurations comprising modifications of the foregoing logical representations of the MoDe-X Single and Dual routers employing physical layout considerations are shown in FIGS. 6a-c.

In further detail, FIGS. 6a and 6b respectively show Row and Column sub-crossbar modules 600R and 600C, which are configured similarly with the exception that a Row sub-crossbar module 300a is used for connecting West and East ports to the local ports in a local module 602a and a Column sub-crossbar module 302a is used for connecting the North and South ports with the local ports in another local module 602b. Each of these modules includes a plurality of tri-state buffers 304 for switching the datapaths between the local ports $L_{in}$ and $L_{out}$ and the row-wise directional ports (i.e., East and West ports $E_{in}/E_{out}$ and $W_{in}/W_{out}$) or column-wise directional ports (i.e., North and South ports $N_{in}/N_{out}$ and $N_{in}/N_{out}$) and tri-state buffers 306 for separating the links depicted horizontally into two segments (e.g., to support both $L_{in} \rightarrow W_{out}$ and $E_{in} \rightarrow L_{out}$ concurrently and $L_{in} \rightarrow N_{out}$ and $S_{in} \rightarrow L_{out}$ concurrently).

As shown in FIG. 6c, a layout aware MoDe-X-Single crossbar 606 comprising a 5×5 crossbar design that is formed by combining the Row and Column sub-crossbar modules 300a and 300b with a local module 604, which in turn is formed by combining the wiring and switches (i.e., tri-state buffers 304) of local modules 602a and 602b into a single local module (note that the tri-state buffers 306 in the $L_{in}/L_{out}$ wires in FIGS. 6a and 6b are reconfigured in FIG. 6c as illustrated by the dashed circles in FIGS. 6a-c). In this manner, the $L_{in}/L_{out}$ ports in local module 604 have connection to both the Row and Column sub-crossbar modules.

FIG. 6c shows an exemplary embodiment of an extended MoDe-X-Dual crossbar 608 comprising a 6×6 crossbar design employing a local module 610 with dual injection. This simplifies the switch arbitration logic and reduces the size of the arbiters inside (as shown in FIG. 4c above), and removes the four tri-state buffers in the local module, but comes with increased wiring to/from the local tile. However, this dual ejection allows concurrent injection/ejection to/from the on-chip network and can help improve network performance after optimization.

Feeder Wiring and Logic

In the MoDe-X-Single crossbar 606 of FIG. 6c, the input port in the Row sub-crossbar module 300a cannot send a flit to an output port of the Column sub-crossbar module 302a and vice versa. Therefore, for this decoupled crossbar to support full 5×5 crossbar connectivity, additional circuitry comprising wiring, switches and logic is employed to selectively feed flits to appropriate sub-crossbar ports. This additional circuitry is referred to as Feeder Wiring and Feeder Logic.

Figure 7A:
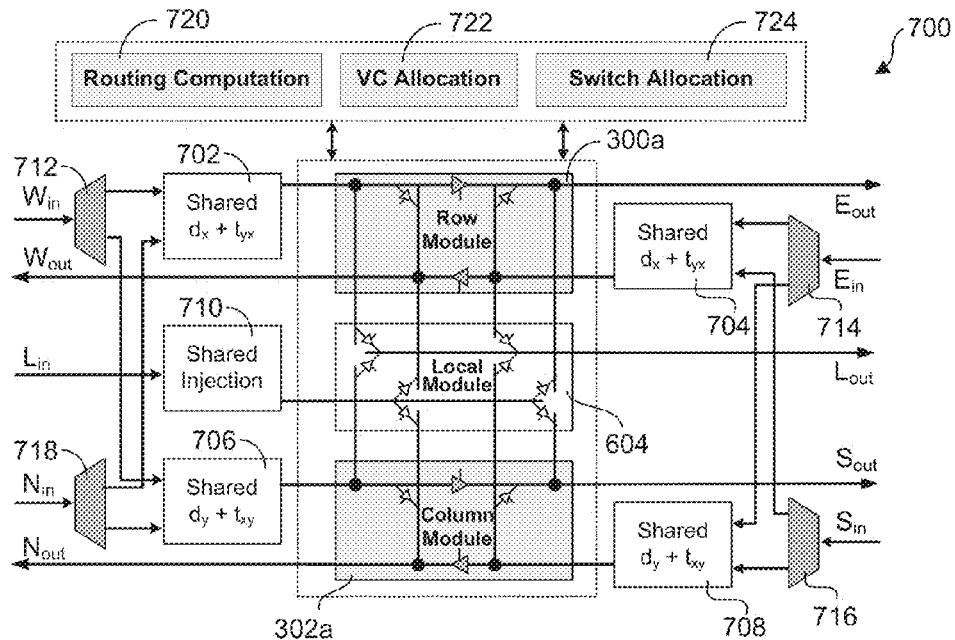
FIG. 7a is a layout-aware MoDe-X-Single router design employing external Feeder Logic, according to one embodiment.

FIG. 7a depicts a MoDe-X-Single router 700 the supports Row to Column routing using one approach that employs feeder wiring and logic comprising additional switching and routing circuitry that is external to the crossbar area. In addition, MoDe-X-Single crossbar 700 includes logic and buffers for effecting associated functionality to support 5×5 crossbar operations.

As illustrated, MoDe-X-Single router 700 employs the same Row, Column, and local sub-crossbar modules 300a, 302a, and 604 as MoDe-X-Single crossbar 606 of FIG. 6c. The additional circuitry and logic includes five shared buffers, including a shared $d_x+t_{yx}$ buffer 702, a shared $d_x+t_{yx}$ buffer 704, a shared $d_y+t_{xy}$ buffer 706, a shared $d_y+t_{xy}$ buffer 708, and a shared injection buffer 710. A demultiplexer (demux) is located at each of the directional input ports, including a West input demux 712, an East input demux 714, a South input demux 716, and a North input demux 718. The operation of the Row, local, and Column sub-crossbar modules is facilitated by routing computation logic 720, VC (Virtual Channel) allocation logic 722, and switch arbitration logic 724.

Figure 7B:
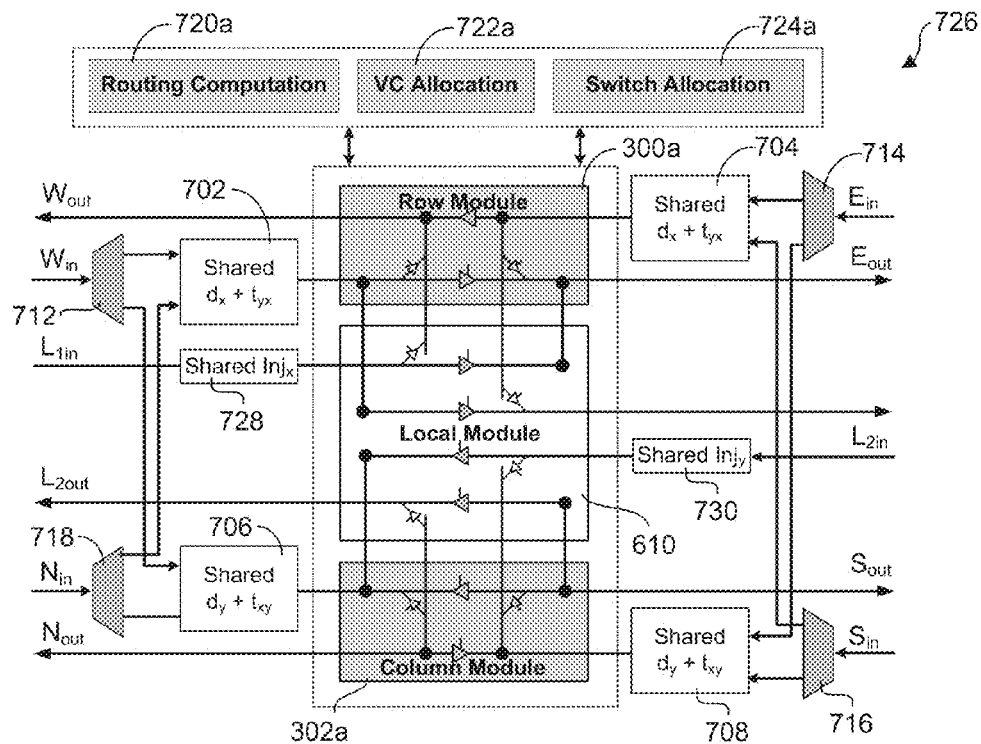
FIG. 7b is a layout-aware MoDe-X-Dual router design employing external Feeder Logic, according to one embodiment.

A similarly configured MoDe-X-Dual router 726 is shown in FIG. 7b. MoDe-X-Dual router 726 employs the same Row, Column, and local sub-crossbar modules 300a, 302a, and 610 as MoDe-X-Dual crossbar 608 of FIG. 6d. The additional circuitry and logic includes six shared buffers, including a shared $d_x+t_{yx}$ buffer 702, a shared $d_x+t_{yx}$ buffer 704, a shared $d_y+t_{xy}$ buffer 706, a shared $d_y+t_{xy}$ buffer 708, a shared X injection ($inj_x$) buffer 728, and a shared Y-injection ($inj_y$) buffer 730. As before, demuxes are located at each of the directional input ports, including a West input demux 712, an East input demux 714, a South input demux 716, and a North input demux 718. The operation of the Row, local, and Column sub-crossbar modules is facilitated by routing computation logic 720a, VC allocation logic 722a, and switch arbitration logic 724a.

Figure 8A:
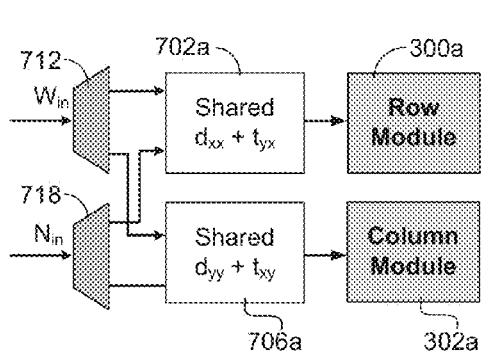
FIG. 8a is a schematic diagram illustrating circuitry for effecting external Feeder Logic.
Figure 8B:
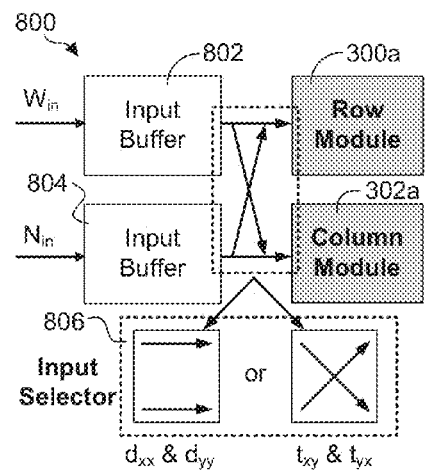
FIG. 8b is a schematic diagram illustrating internal Feeder Logic embedded on crossbar circuitry.

The use of external feeder wiring and demuxes increases the area occupied by the routers, while also increasing the feeder wire path lengths. However, in some embodiments the feeder wiring and associated switches are implemented internal to the router crossbar area, leading to both area reduction and power savings. This is accomplished by moving the feeder wires between the input demuxes 712 and 718 and shared buffers 702a and 706a as shown in FIG. 8a, to between the input buffer and sub-crossbars modules as shown in FIG. 8b. With this relocation of feeder wires and optimizations described below, power consumption can be significantly reduced by removing input demuxes and decreasing the shared buffer size (by reducing the number of input ports from 2 to 1). In one embodiment, feeder wire embedding is implemented in combination with a single input-port shared-buffer design, as shown in FIG. 8b. Moreover, overall router area can be reduced by overlaying the Feeder Wires over crossbar wires as described below.

In further detail, under the Feeder Logic 800 configuration shown in FIG. 8b, input $W_{in}$ and $N_{in}$ flits are received at shared input buffers 802 and 804. Input Selector logic 806 is then used to determine how the flits in input buffers 802 and 804 are fed to Row sub-crossbar module 300a and Column sub-crossbar module 302a. Note that a shared-buffer architecture is used to improve router buffer utilization and the Feeder Logic is used to determine which sub-crossbar the output port of the shared input buffer should drive to route the input flit. In the illustrated embodiment, the allowed connection patterns between the two shared buffers and the two sub-crossbars are limited due to this selective driving; either two straight ($d_{xx}$ and $d_{yy}$) or two crossing connections ($t_{xy}$ and $t_{yx}$) as shown in FIG. 8b are allowed to avoid data mingling. Such decisions should be made before the Switch Arbitration stage in order to circumvent any delay in the critical path of the router pipeline. For this purpose, Input Selector logic 806 is configured to determine the connection pattern based on predetermined criteria such as ratio of straight and turning flits in the shared buffer, recent transfer history, round-robin, etc. As a result, Input Selector logic 806 can run in parallel with other router pipelines without increasing the critical path delay.

Figure 9:
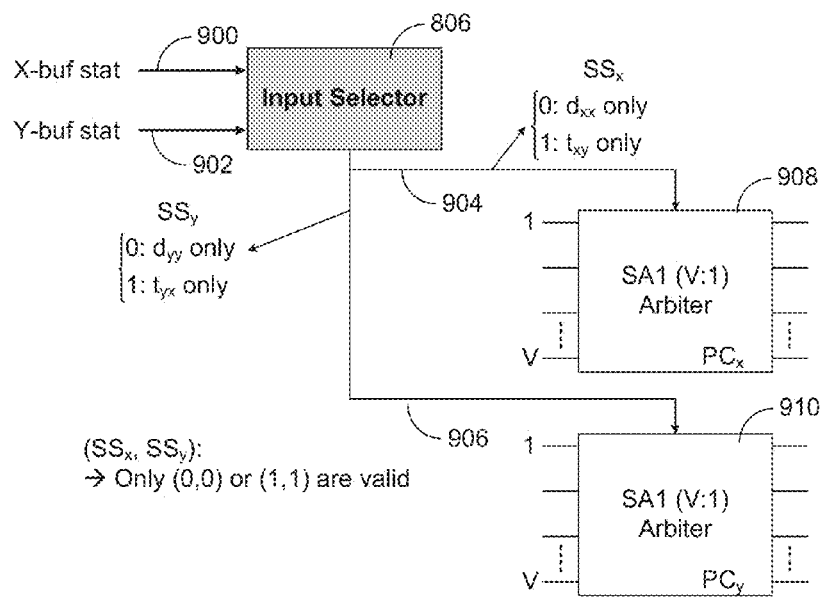
FIG. 9 is a schematic diagram illustrating details of the input selector of FIG. 8b, according to one embodiment.

FIG. 9 shows the basic architecture of one embodiment of the Input Selector logic 806, which takes buffer status as inputs 900 and 902 and generates selection signals 904 and 906 that are directly fed to arbiters 910 and 912 in the switch allocation logic. Then each of arbiters 910 and 912 will consider only those requests that the selection signal indicates during its operation.

Figure 10A:
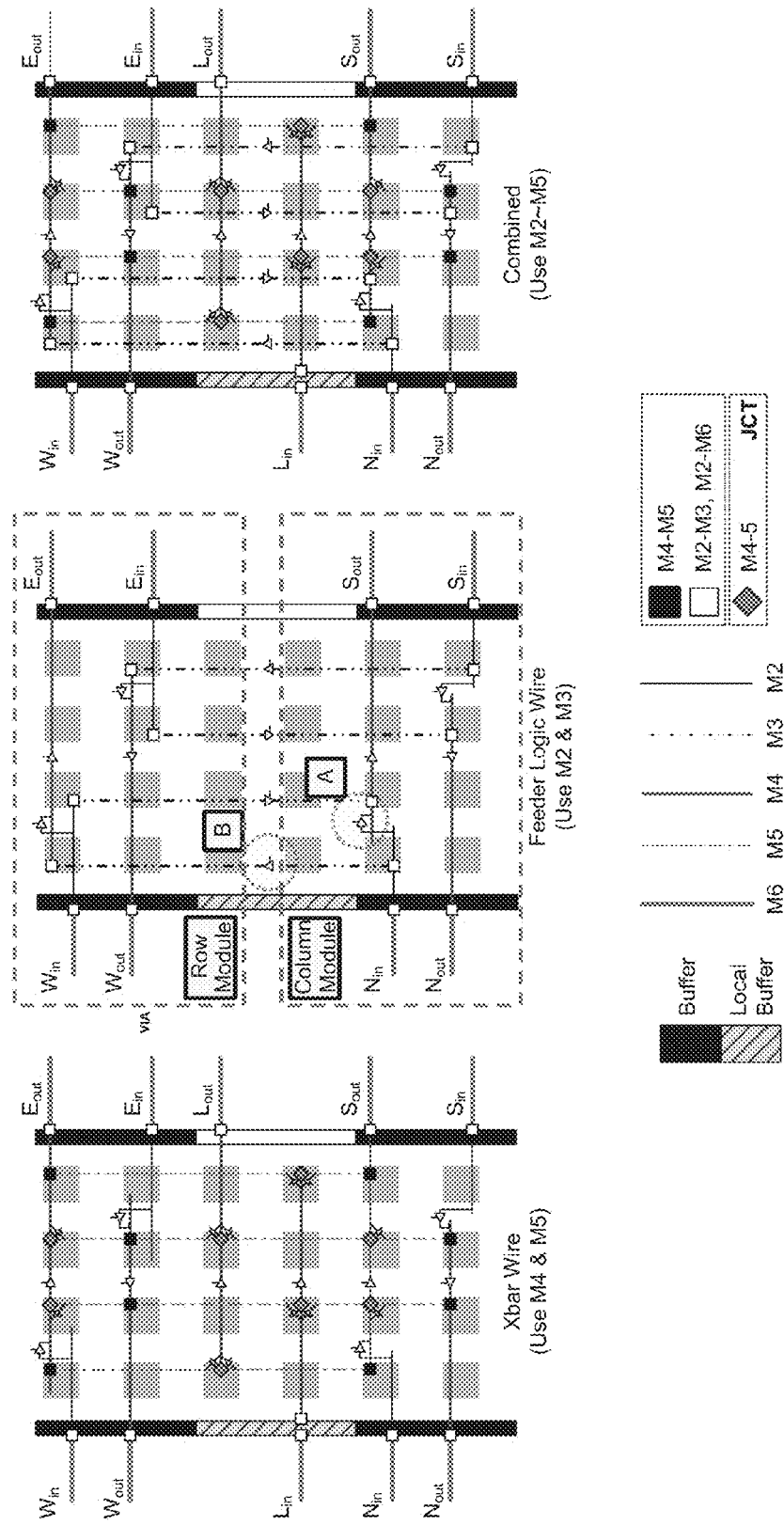
FIG. 10a is a schematic circuit layout diagram showing circuit layout configuration and corresponding metal layers for a MoDe-X-Single crossbar including embedded Feeder Logic, according to one embodiment.
Figure 10B:
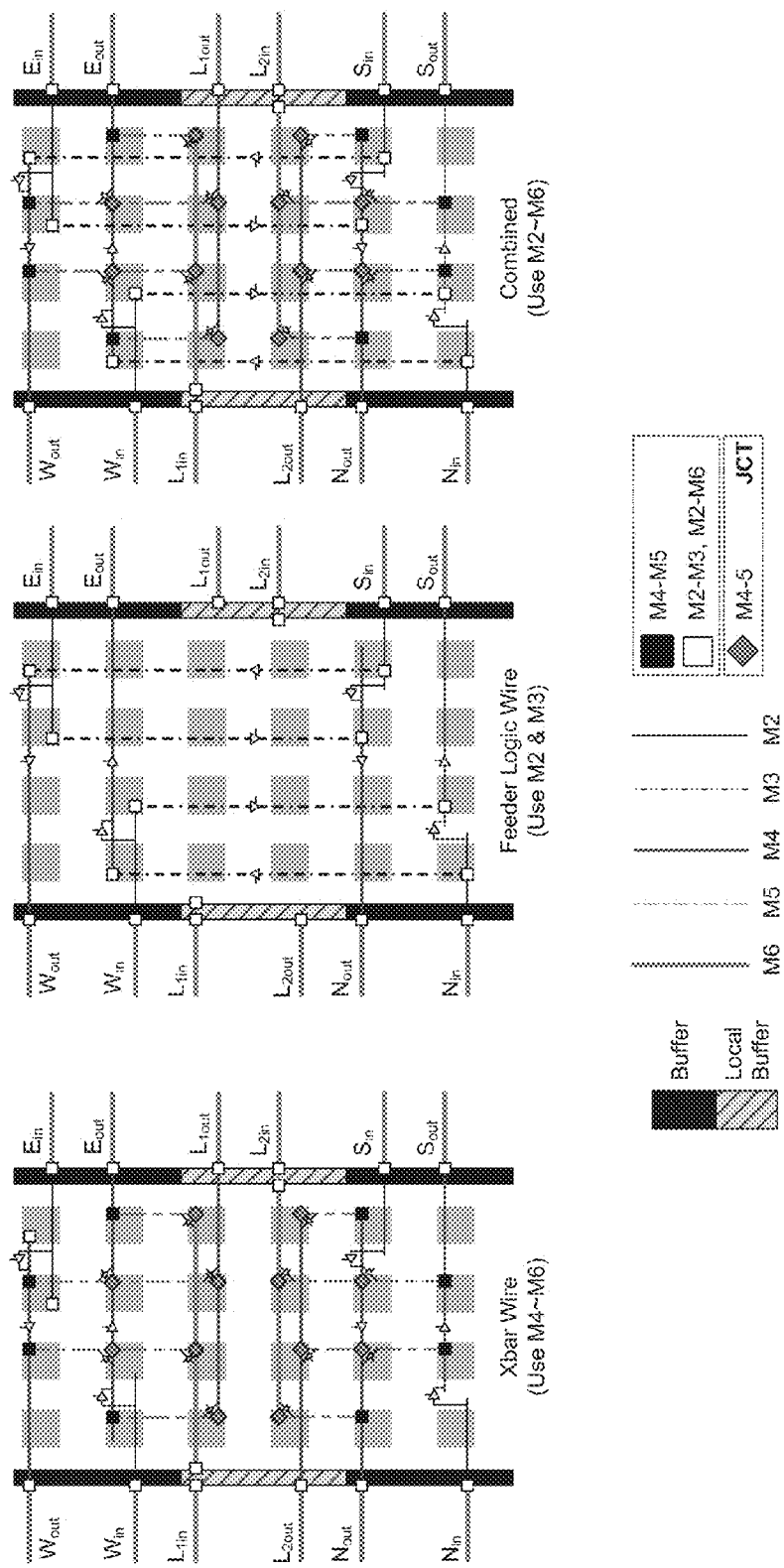
FIG. 10b is a schematic circuit layout diagram showing circuit layout configuration and corresponding metal layers for a MoDe-X-Dual crossbar including embedded Feeder Logic, according to one embodiment.

As discussed above, to further reduce the overall area requirement, the Feeder Logic (i.e., Feeder Wires, switches and Input Selector logic) can be embedded onto the existing crossbar circuitry. Typically, crossbars use only a limited number of metal layers due to design constraints, and thus have some room for additional wiring in other unused metal layers. Therefore, the Feeder Logic wiring can be placed on metal layers that are not used by the crossbar as long as the wiring does not interfere with the crossbar wiring. FIG. 10a shows an example layout of an MoDe-X-Single crossbar with embedded Feeder Logic, while FIG. 10b shows an example layout of an MoDe-X-Dual crossbar with embedded Feeder Logic. In FIGS. 10a and 10b the larger squares are provided to illustrate an exemplary number of wire buses. Also, the layout of wiring on the various metal layers is depicted via the use of different line types, as illustrated in the legend toward the bottom of the figures.

The Feeder Logic's connection pattern is controlled by two tri-state buffers, as depicted in the Feeder Wire schematic in the center of FIG. 10a. For example, if a flit in the North input buffer is supposed to go straight, the horizontal tri-state buffer ('A' in FIG. 10a)) will become active and the output of the shared buffer will have a direct connection to the Row module sub-crossbar. Likewise, if it needs to make a turn, the vertical tri-state buffer ('B' in FIG. 10a) between two modular sub-crossbars will be activated and the buffer output will be connected to the Column module sub-crossbar.

Note that most of the Feeder Logic wires are overlaid right below (or above) the crossbar wires without incurring area overhead (two parallel wire buses in both horizontal and vertical directions that are enclosed within the same square can be safely overlapped since they use different metal layers). However, the overall crossbar size will increase slightly, although minimal, due to additional tri-state buffers that are used to control the connection patterns. It is further noted that in the MoDe-X-Dual crossbar of FIG. 10b the local injection port (using the M6 layer) and ejection port (using the M4 layer) can be overlapped, maintaining the same number of horizontal wire buses as in the MoDe-X-Single crossbar case.

Figures 11A, 11B:
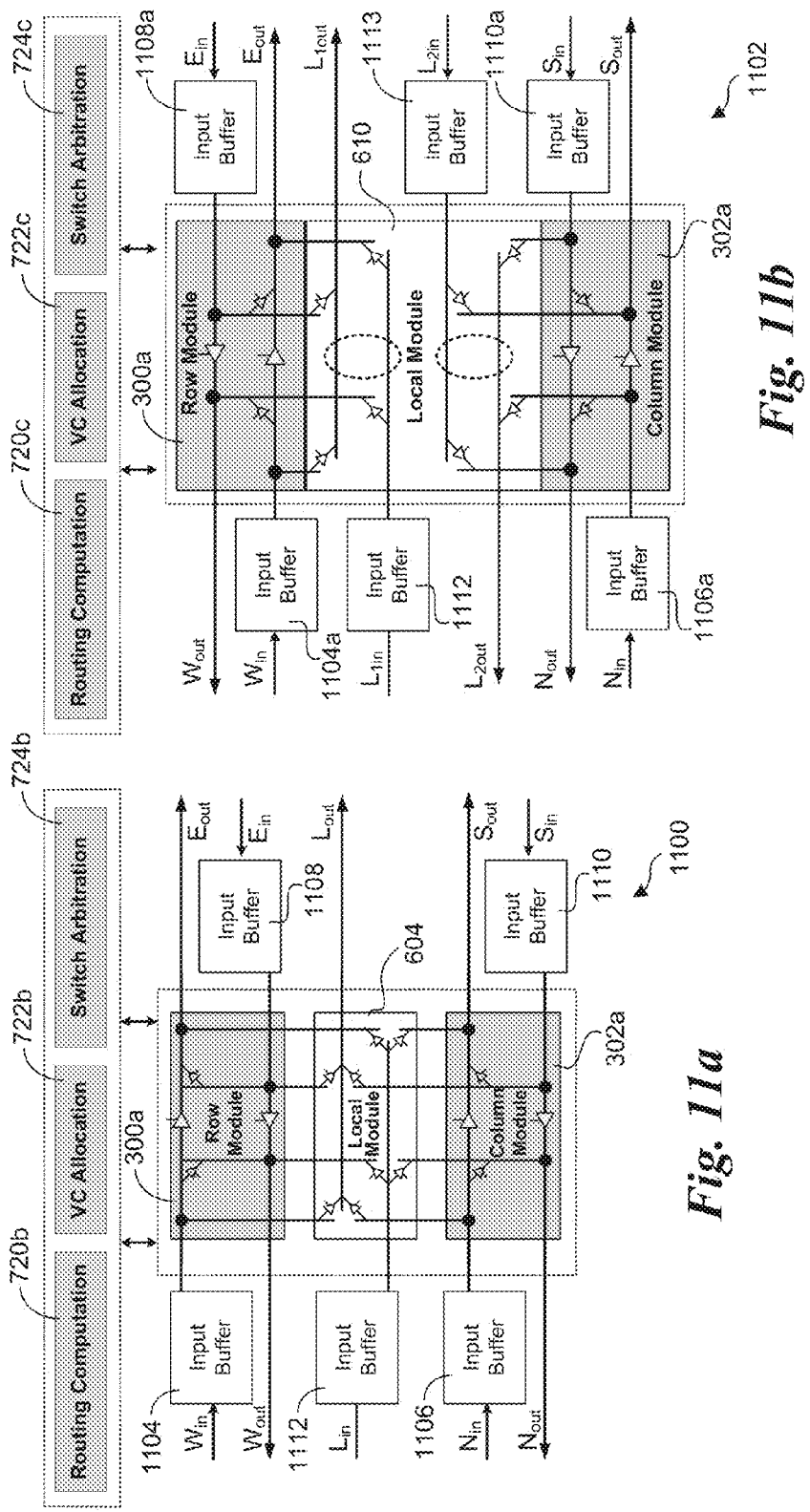
FIG. 11a is schematic block diagram illustrating a MoDe-X-Single router overall architecture, according to one embodiment.
FIG. 11b is schematic block diagram illustrating a MoDe-X-Dual router overall architecture, according to one embodiment.

FIGS. 11a and 11b respectively show exemplary embodiments of overall architectures for a MoDe-X-Single router 1100 and a MoDe-X-Dual router 1102, with the Feeder wires, Input Selector logic, and tri-state buffer switches not shown for clarity. It shall be understood that an actual implementation of MoDe-X-Single router 1100 and a MoDe-X-Dual router 1102 would include Feeder Logic including associated Feeder wires and tri-state buffer switches, such as illustrated in FIGS. 10a and 10b.

MoDe-X-Single router 1100 employs five input buffers including a West input buffer 1104, a North input buffer 1106, an East input buffer 1108, a South input buffer 1110, and a local input buffer 1112. The West and East input buffers 1104 and 1108 are fed into a Row sub-crossbar module 300a, while the North and South input buffers are fed into a Column sub-crossbar module 302a. Local input buffer 1112 is fed into a local module 604, which is operatively coupled between Row sub-crossbar module 300a and Column sub-crossbar module 302a. The operation of the row, local, and Column sub-crossbar modules is facilitated by routing computation logic 720b, VC (Virtual Channel) allocation logic 722b, and switch arbitration logic 724b.

MoDe-X-Dual router 1102 is similarly configured to single injection MD router 1100, with the substitution of local module 608 for local module 604 and the addition of a sixth input buffer. As shown in FIG. 11b, the six input buffers of MoDe-X-Dual router 1102 include a West input buffer 1104a, a North input buffer 1106a, an East input buffer 1108a, a South input buffer 1110a, and two local input buffer 1112 and 1113. The West and East input buffers 1104a and 1108a are fed into a Row sub-crossbar module 300a, while the North and South input buffers 1106a and 1110a are fed into a Column sub-crossbar module 302a. Local input buffers 1112 and 1113 are fed into a local module 608, which is operatively coupled between Row sub-crossbar module 300a and Column sub-crossbar module 302a. The operation of the Row, local, and Column sub-crossbar modules is facilitated by routing computation logic 720c, VC (Virtual Channel) allocation logic 722c, and switch arbitration logic 724c.

For both of the MoDe-X-Single and MoDe-X-Dual routers, each input port needs only two Virtual Channel (VC) sets—one for intra-dimensional ($d_{xx}$ or $d_{yy}$, going straight) packets and one for inter-dimensional ($t_{xy}$ or $t_{yx}$; turning) packets. Since a shared buffer architecture within each physical input port is employed to maximize buffer utilization, these VC sets share buffer space. Also, as described above, the injection/ejection link pair can be overlapped in the layout in MoDe-X-Dual router case, as indicated by the dashed circles in FIG. 11b.

Area Estimates

The area of the crossbar is determined by the minimal width and height of the wire buses. Typically, horizontal and vertical wire buses reside on different metal layers and thus, the width/height of them differs among each other. To correctly estimate the width of a wire bus, the wire pitch and spacing of each metal layer is considered. Table 2 summarized the minimal crossbar area requirement for four different architectures in 45 nm technology and the MD crossbars have more than 40% area savings over generic counterparts. For generic 5×5 crossbar, the layout shown in FIGS. 9a and 9b was used.

TABLE 2

Minimal crossbar area requirement (Wire Bus BW: 128 bits)

| | Area | MD Area Saving over Generic |
| --- | --- | --- |
| Generic (5 port) | 292,035 um² | |
| MD-Single (5 port) | 175,229 um² | 40% |
| Generic (6 port) | 394,234 um² | |
| MD-Dual (6 port) | 230,775 um² | 41% |

However, these figures do not consider the height of buffers and flip-flops connected to the crossbar and thus, they are not representative of actual crossbar area requirement. Table 3 shows the area considering these additional modules. Since these buffers and flip-flops are typically located in both left and right side of the crossbar, they do not affect crossbar width (of course, they affect overall router width) and only crossbar height is subject to change. The minimal height for the optimized buffer and flip-flops is calculated and found to always be greater than the minimal crossbar height requirements. Therefore, the height for all four crossbar architectures is set to that of the buffer and flip-flops combined and as a result, the area saving is less (still greater than 20%, though). Note that the numbers shown here are estimates and shown just for relative comparison between different crossbar architectures. Actual crossbar area needs to be determined considering several other design factors.

TABLE 3

| | Area | MD Area Saving over Generic |
|---|---|---|
| Generic (5 port) | 334,707 um² | |
| MD-Single (5 port) | 267,779 um² | 20% |
| Generic (6 port) | 401,635 um² | |
| MD-Dual (6port) | 267,779 um² | 33% |

Minimal Crossbar Area Requirement with Buffer and Flip-Flop (Wire Bus BW: 128 Bits)

The area saving indicates reduced wire length, which in turn, leads to reduced wire power consumption. Also, combined with the segmented design of the crossbar, overall crossbar power saving is expected to be significant. Considering the fact that crossbar is one of the major power consumers among the modules in an on-chip router, this indicates significant power saving in overall on-chip router. If we can further optimize buffers and flip-flops such that their height is not greater than crossbar's minimal height requirement, then we can further reduce crossbar size as shown in Table 2 and can obtain even larger power savings.

An additional advantage of reduced crossbar area is reduced RC (Resistive-Capacitive) delay of the control path. For example, in view of the reduced wire lengths, the RC delay for an arbitration grant signal from an output port to an input port will be significantly reduced.

Exemplary SoC Configuration Having NoC Employing MoDe-X Routers

Figure 12:
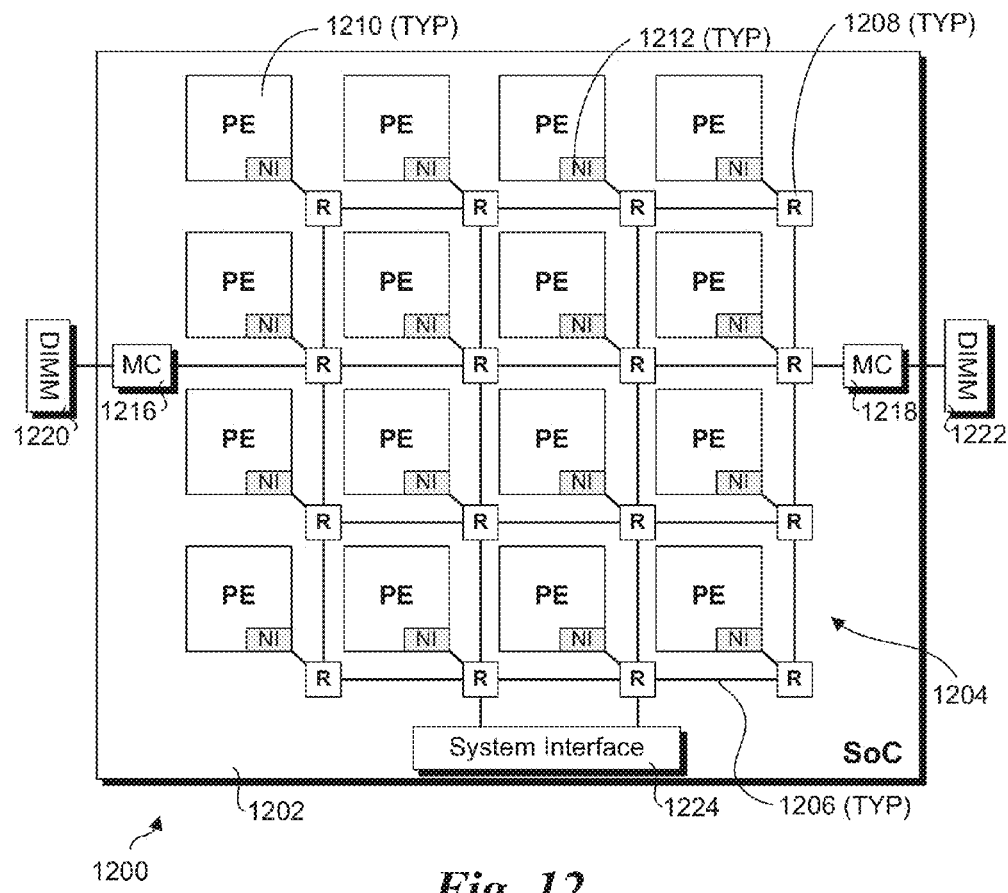
FIG. 12 is a schematic block diagram of an exemplary System on a Chip (SoC) including a 2D mesh interconnect and processing element configuration including 5-port routers that may be implemented as MoDe-X-Single and/or MoDe-X-Dual routers.

A system 1200 including an SoC 1202 having an exemplary configuration under which aspects of the embodiments described herein may be implemented is shown in FIG. 12. SoC 1202 includes a Network on a Chip (NoC) 1204 comprising a 2D Mesh interconnect fabric having a plurality of interconnect links 1206 and a plurality of routers 1208. Each router includes a local module that is coupled to a respective processing element (PE) 1210 at a network interface (NI) 1212, forming a 2D array of PE's. Although 16 PE's are shown in FIG. 12, this is merely illustrative, as the number of PE's can vary from a lesser number of PE's to many more, such as but not limited to 8, 24, 32, 48, 64, etc., as well as numbers in-between.

The PE's are illustrative of various types of processing elements commonly used in SoCs, such as processor cores, hardware accelerators (e.g., video decoders, graphics, imaging, etc), memory-related components (e.g., memory controllers), and I/O interfaces (e.g., PCIe, QPI, etc.). In the illustrated embodiment, a pair of memory controllers 1216 and 1218 are depicted as coupled to respective memory blocks 1220 and 1222 (depicted as DIMM (Dual in-line Memory Modules)) and to respective routers on SoC 1202. Also depicted is a system interface 1224, which is illustrative of one or more interfaces between SoC 1202 and other system components that are not shown. As will be recognized by those skilled in the art, an actual SoC would include additional components that are not shown in order to not obscure the aspects illustrated in FIG. 12.

In further detail, a portion of routers 1208 provide five-way connections (e.g., North, East, South, West, and Local) while others provide four-way and three-way connections, as illustrated. The routers at each five-way connection may be implemented as either a MoDe-X-Single or MoDe-X-Dual router (depending on whether one or two local injection ports are to be implemented) configured in accordance with the embodiments presented above. Optionally, a mixture of MoDe-X-Single and MoDe-X-Dual routers may be implemented for different five-way connected routers. Generally, the four-way and three-way connected routers may be implemented using conventional architectures. As will be recognized, for 2D PE arrays configured as shown in FIG. 12, as the number of routers with five-way connections increases as the number of PE's increase. Accordingly, the larger the number of PE's, the greater the reduction in router area and power savings when using MoDe-X-Single routers and/or MoDe-X-Dual routers in place of conventional 5-port routers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A router, comprising:
    a local module, including a local input port and a local output port;
    a row sub-crossbar module, operatively coupled to the local module via a first set of crossbar wiring and switches and including West input and output ports and East input and output ports;
    a column sub-crossbar module, operatively coupled to the local module via a second set of crossbar wiring and switches and including North input and output ports and South input and output ports;
    feeder wiring and switches, configurable to selectively couple the row sub-crossbar module to the column sub-crossbar module; and
    logic for controlling the first and second sets of crossbar wiring and switches and the feeder wiring and switches to effect routing between the local, West, East, North, and South input and output ports,
    wherein the logic for controlling the first and second sets of crossbar wiring and switches includes routing computation logic, virtual channel allocation logic, and switch arbitration logic.

2. The router of claim 1, wherein the local module further comprises a second local input port and a second local output port.

3. The router of claim 1, wherein the logic for controlling the feeder wiring and switches includes feeder logic for selectively routing data between the row sub-crossbar module and the column sub-crossbar module.

4. The router of claim 1, wherein the row sub-crossbar module and the column sub-crossbar module are configured as decoupled 3×3 sub-crossbar routers.

5. The router of claim 1, wherein the feeder wiring is disposed on a metal layer that is different than metal layers used for segments of the first and second set of crossbar wiring and segments of the feeder wiring are routed to overlap with segments of the first and second sets of crossbar wiring.

6. The router of claim 1, further including respective shared input buffers operatively coupled to each of the local, West, East, North, and South input ports.

7. The router of claim 1, wherein the router is selectively configurable such that multiple portions of data may be concurrently routed across each of the row and column sub-crossbar modules or routed between the row and column sub-crossbar modules.

8. A method for effecting routing in at a 5-port router including local ports, West ports, East ports, North ports, and South ports, comprising:
routing data between the local ports, West ports, and East ports using a first 3×3 sub-crossbar;
routing data between the local ports, North ports, and South ports using a second 3×3 sub-crossbar; and
selectively coupling paths between the first and second 3×3 sub-crossbars to support routing of data along turned paths between the West and East ports and the North and South ports,
wherein the 5-port router includes logic for controlling the first and second sub-crossbars comprising routing computation logic, virtual channel allocation logic, and switch arbitration logic.

9. The method of claim 8, wherein the local ports include first and second input and output ports.

10. The method of claim 8, wherein the first 3×3 sub-crossbar comprises a row sub-crossbar module having West and East ports and being coupled to a local module having at least one input port.

11. The method of claim 10, wherein the second 3×3 sub-crossbar comprises a column sub-crossbar module having North and South ports and coupled to the local module.

12. The method of claim 8, wherein paths are selectively coupled between the first and second 3×3 sub-crossbars using feeder wiring, switches, and control logic that switches paths in the router to selectively enable each of flows across the first 3×3 sub-crossbar, flows across the second 3×3 sub-crossbar and flows that cross between the first and second 3×3 sub-crossbars.

13. A System on a Chip (SoC), comprising:
a plurality of processing elements configured in a two-dimensional (2D) array, each having a network interface;
a 2D mesh interconnect forming a plurality of rows and columns; and
a plurality of routers, coupled to rows and columns of the 2D mesh interconnect and coupled to the plurality of processing elements via the network interfaces, the plurality of routers including at least one 5-port router comprising decoupled row and column sub-crossbars and including feeder wiring and logic configured to enable data to be selectively routed between the row and column sub-crossbars,
wherein at least one of said at least one 5-port router includes logic for controlling the row and column sub-crossbars comprising routing computation logic, virtual channel allocation logic, and switch arbitration logic.

14. The SoC of claim 13, wherein each of the row and column sub-crossbars comprises a 3×3 crossbar.

15. The SoC of claim 13, wherein the at least one 5-port router is selectively configurable such that multiple messages may be concurrently routed across each of the row and column sub-crossbars or routed between the row and column sub-crossbars.

16. The SoC of claim 13, wherein at least one 5-port router includes two local input ports.

17. The SoC of claim 13, wherein the feeder wiring is disposed on a metal layer that is different than metal layers used for segments of row and column sub-crossbar wiring and segments of the feeder wiring are routed to overlap with segments of the row and column sub-crossbar wiring.

18. The SoC of claim 13, wherein the row and column sub-crossbars include wire segments that may be selectively coupled to local input or output wire segments via a plurality of tri-state buffers.

* * * * *